US005454284A

United States Patent [19]

Sbalchiero et al.

[11] Patent Number: 5,454,284

[45] Date of Patent: Oct. 3, 1995

[54] COMMUTATOR FINISHING METHODS AND APPARATUS

[75] Inventors: Federico Sbalchiero; Giuseppe Cardini; Antonio Lumini, all of Florence, Italy

[73] Assignee: Axis USA, Inc., Tampa, Fla.

[21] Appl. No.: 86,723

[22] Filed: Jul. 2, 1993

[51] Int. Cl.[6] .......... B23B 3/00

[52] U.S. Cl. .......... 82/1.11; 82/118; 29/598; 29/27 B

[58] Field of Search .......... 29/27 R, 27 B, 29/597, 598; 51/244; 82/1.11, 118, 903

[56] References Cited

U.S. PATENT DOCUMENTS

| | | | |
|---|---|---|---|
| 2,061,398 | 11/1936 | Green | 29/27 B |
| 2,064,079 | 12/1936 | Poole | 29/27 B |
| 2,718,177 | 9/1955 | Karmann | 90/15.1 |
| 3,722,144 | 3/1973 | Rickrode et al. | 51/328 |
| 3,965,623 | 6/1976 | Grutza et al. | 51/281 |
| 4,525,957 | 7/1985 | Daniels | 51/244 |
| 4,536,915 | 8/1985 | Guglielmo | 51/244 |
| 5,065,651 | 11/1991 | Amey | 82/1.11 |
| 5,177,842 | 1/1993 | Hongo | 29/27 B |

*Primary Examiner*—Jack W. Lavinder
*Attorney, Agent, or Firm*—Fish & Neve; Robert R. Jackson; Robert W. Morris

[57] ABSTRACT

Commutators of armatures for electric motors or other dynamo-electric machines are finished by subjecting them to inspection and turning operations. The first inspection operation determines the minimum amount of material that can be cut while producing a high quality armature. This determination may indicate that no formal turning is required, only finishing. The turning operation, if applicable, cuts the commutator to a substantially cylindrical shape which is substantially concentric with the axis of rotation of the armature. The finishing operation, which may be performed by the same mechanism as the turning operation, imparts a desired axial roughness to the cylindrical commutator surface. The commutators may be inspected after the turning and finishing operations to generate data useful for such purposes as automatically modifying the turning and finishing operations performed on subsequent commutators.

34 Claims, 13 Drawing Sheets

FIG. 4
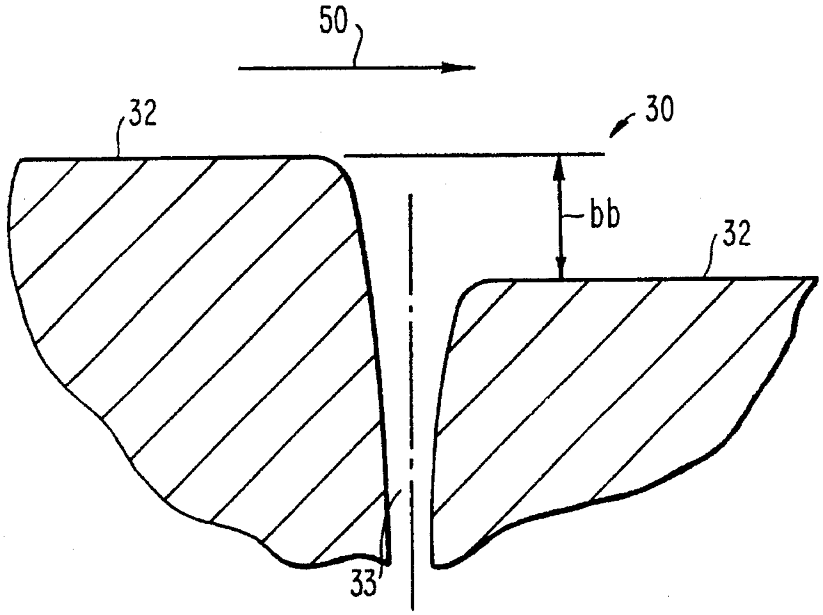
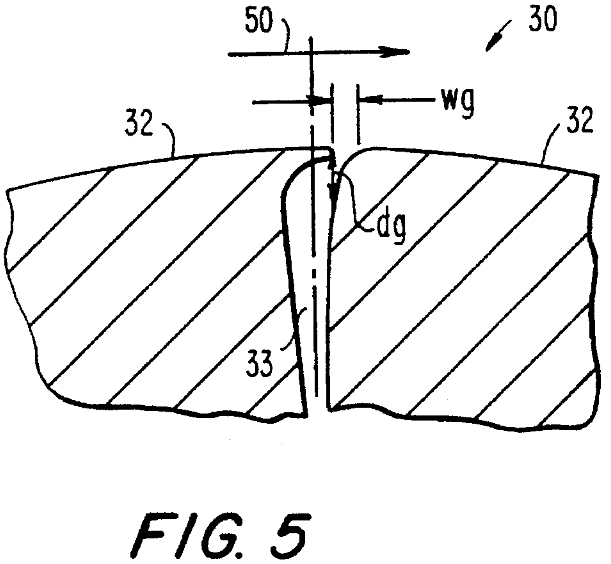
FIG. 5

SYSTEM CONTROL
102
KEYBOARD
104
MONITOR
106
PROCESSOR
100
PRELIMINARY SENSING
170
182/192/196
184
253
292
213
290
284
282
270
260
250
251
210
211
10
60
62
64

COMMUTATOR FINISHING METHODS AND APPARATUS

BACKGROUND OF THE INVENTION

This invention relates to methods and apparatus for finishing the surfaces of commutators on armatures for electric motors or other dynamo-electric machines.

The condition of the finished surface of a dynamo-electric machine armature commutator is of considerable importance to the satisfactory operation of the machine. For example, in an electric motor which has a cylindrical commutator surface on its armature, perfect roundness and concentricity of the finished commutator surface helps ensure steady contact between the rotating commutator and the stationary brushes which bear on the commutator during operation of the motor. On the other hand, the surface of the commutator is preferably neither too smooth nor too rough. If the commutator surface is too smooth, the commutator will not cause the brushes to "run in" properly, which may cause undue current concentrations or arcing in the regions of contact between the brushes and the commutator. If the commutator surface is too rough, the brushes may wear too rapidly. Commutator surface conditions such as these become more important with increased motor speed, and there is growing interest in motors that operate at higher speeds.

There is also increasing interest in motor manufacturing equipment that can make motors more quickly. This means that the traditional quality control methods, which involve periodically testing completed motor parts, may not detect defects (e.g., due to worn or broken tooling, or tooling which is improperly or sub-optimally adjusted) early enough to prevent the production of large quantities of unacceptable parts.

A desired increase in manufacturing speed also means that many traditional manufacturing systems, which include process steps that limit the speed at which motors can be manufactured, must be revised. For example, traditional commutator turning operations require that commutators be turned to a predetermined diameter and then turned again to finish the surface of the commutator. This typically results in a substantial portion of at least some of the commutators being cut off (through the first turning operation). As such, the armatures must be formed from commutator bars that initially are artificially thick resulting in excessive supply costs for copper (a typical commutator material) which is not part of the finished product.

In view of the foregoing, it is an object of this invention to provide improved methods and apparatus for finishing commutator surfaces.

It is another object of this invention to provide commutator surface finishing methods and apparatus which do not require artificially thick commutator bars before commutator finishing.

It is a further object of this invention to provide commutator surface finishing methods and apparatus which reduce the time required to finish a commutator.

It is a more particular object of this invention to provide commutator surface finishing methods and apparatus which include more "in-line" monitoring of the condition of the commutator surface in order to detect possible defects more quickly and thereby prevent the production of large numbers of defective parts prior to defect detection.

It is still another more particular object of this invention to provide commutator surface finishing methods and apparatus in which "in-line" monitoring of the condition of the commutator surface is used for such purposes as detecting trends that may indicate that defective parts are about to be produced so that corrective action can be taken before such defective parts are actually produced.

It is yet another more particular object of this invention to provide commutator surface finishing methods and apparatus in which "in-line" monitoring of the characteristics of the commutator surface is used to provide early warning to the operator of a problem or an incipient problem and/or automatic adjustment of the commutator surface finishing apparatus to correct the problem or incipient problem.

SUMMARY OF THE INVENTION

These and other objects of the invention are accomplished in accordance with the principles of the invention by commutator finishing methods and apparatus in which the surface of the commutator is inspected before any turning occurs in order to determine the minimum cut that can be made. The pre-turning inspection may provide indications that the commutator only requires minor turning, or none at all (except for finishing), thereby reducing the size requirements of the preprocessed commutator bars. This also enables the apparatus to perform the finishing cut, thereby reducing the manufacturing time and increasing productivity throughput. For clarity, finish turning is referred to as merely finishing throughout the application and turning refers to non-finishing (i.e., more severe cutting) operations. Applicants stress the fact that finishing requires turning (as is well known in the art) and that finishing must be performed on all armatures.

The commutator methods and apparatus of this invention may also include inspecting and turning of the surface of the lamination stack before commutator turning occurs. Changes in the surface characteristics of the lamination stack (e.g., the overall cylindrical shape of the stack) may positively contribute to commutator turning by further balancing the armature by reducing the vibrations caused by armature imbalance. A reduction in vibrations tends to reduce requirements for turning because the commutator appears more consistent to the inspection subsystem, in addition to the fact that the final product can be operated at greater speeds due to the improved balance.

The commutator methods and apparatus of this invention are such that commutator surface characteristics including: roundness, concentricity, roughness, changes in radius from commutator bar to commutator bar, and circumferential spacing between commutator bars, are detected at appropriate times before, during, or immediately after the commutator finishing process in order to provide a basis for such action as (1) early indication to the operator that the commutator finishing apparatus needs to be adjusted, or (2) automatic adjustment of the commutator finishing apparatus without operator intervention. Adjustments that may be effected by the operator include replacement of a worn or defective tool. Adjustments that may be effected automatically include modification of the cutting depth of a tool.

Further features of the invention, its nature and various advantages will be more apparent from the accompanying drawings and the following detailed description of the preferred embodiments.

BRIEF DESCRIPTION OF DRAWINGS

FIG. 4 is a sectional view of a portion of a somewhat defectively finished or partly finished commutator, the depicted surface segments being shown linear rather than curved for simplicity.

FIG. 5 is a sectional view of another somewhat defectively finished or partly finished commutator.

FIG. 6 also includes a mathematical expression for a characteristic of the depicted surface plot.

DETAILED DESCRIPTION OF THE PREFERRED EMBODIMENTS

Figure 1:
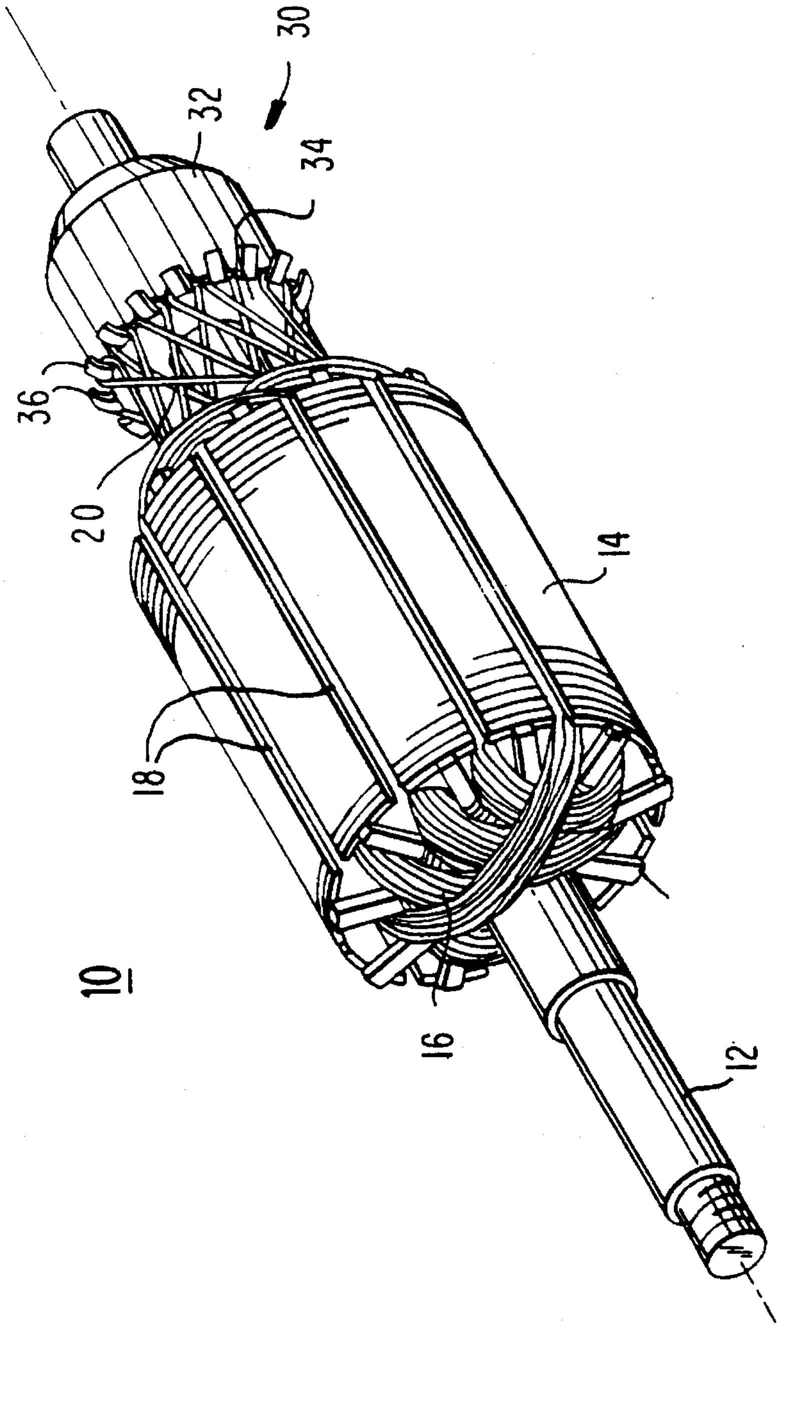
FIG. 1 PRIOR ART
FIG. 1 is an isometric view of a typical prior art armature prior to finishing of the commutator on the armature.

Although the invention is also applicable to finishing commutators used in other types of dynamo-electric machines, the invention will be fully understood from the following explanation of its use in finishing the cylindrical surfaces of commutators on electric motor armatures such as the one shown in FIG. 1.

As shown in FIG. 1, typical electric motor armature 10 has a longitudinal shaft 12, a lamination stack 14 mounted concentrically on the shaft, coils of wire 16 wound around various chords of the lamination stack by being principally deposited in axial slots 18 in the lamination stack, and a commutator 30 mounted concentrically on the shaft adjacent one axial end of the lamination stack. Commutator 30 includes a plurality of circumferentially spaced, axially extending bars 32 which are partly embedded in an underlying annulus 34 of an insulating material such as a resin material. Wire leads 20 from coils 16 are looped around tangs 36 on commutator bars 32 in order to electrically connect coils 16 to bars 32.

FIG. 1 shows armature 10 before tangs 36 have been bent down over leads 20 and fused to those leads and the remainder of bars 32 as described, for example, in Rossi U.S. Pat. No. 5,063,279. FIG. 1 therefore also shows armature 10 prior to finishing of the cylindrical surface of commutator 30. Before the commutator is finished as described below, tangs 36 have typically been bent down and fused to the underlying leads 20 and commutator bar surfaces.

Before describing the improved commutator finishing methods and apparatus of this invention, it is useful to consider the commutator surface characteristics which can occur and which either must be dealt with or avoided, if possible, in the finishing operation.

Figure 2:
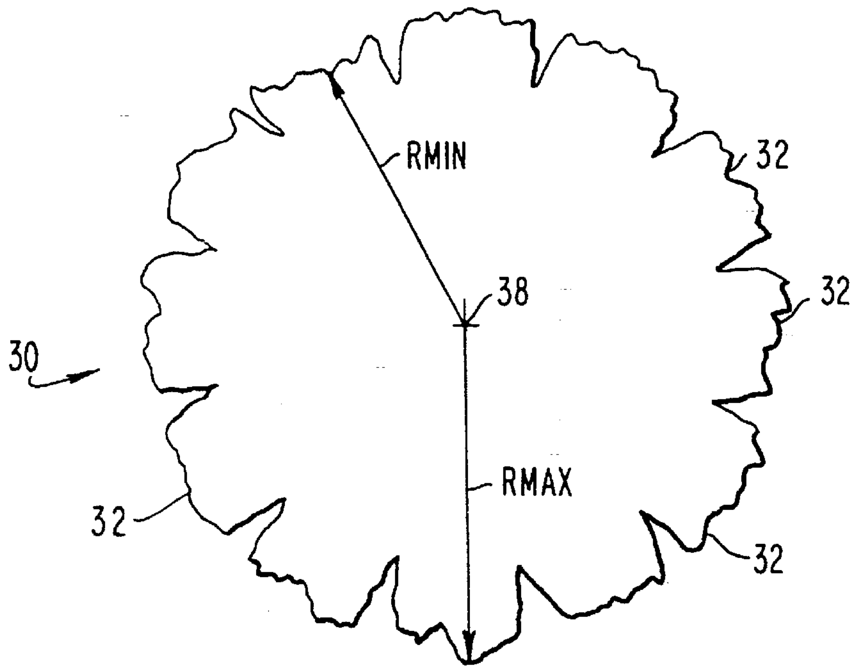
FIG. 2 is a plot of a typical circumference of a commutator prior to finishing. Certain radial dimensional characteristics are somewhat exaggerated in FIG. 2 for purposes of clearer illustration and discussion.

FIG. 2 shows the cylindrical surface contour of typical commutator 30 prior to finishing. FIG. 2 is simplified in that it does not attempt to fully delineate the several commutator bars 32, the underlying resin annulus 34, or the central shaft 12, although the center of the shaft is indicated by reference line intersection 38. Also in FIG. 2 the initial roughness of the surfaces of commutator bars 32 is somewhat exaggerated to emphasize the point that these surfaces may initially be quite rough and irregular. FIG. 2 illustrates that there can be a substantial difference between the minimum (RMIN) and maximum (RMAX) distance from the center 38 of shaft 12 to the commutator bar surfaces prior to finishing. This difference (sometimes referred to as the "run out" of the commutator) may be due to such factors as (1) less than perfect roundness of the combined commutator bar surfaces, (2) less than perfect concentricity of the combined bar surfaces with shaft 12, and/or (3) roughness of the unfinished bar surfaces. (The term "run out" is also sometimes used to refer to commutator diameter (rather than radius) variations, but diameter and radius are interrelated, and so it will generally be sufficient herein to speak of only one or the other.) Despite such initial run out, the finishing process must be such as to render the surface of the commutator round and concentric with shaft 12 to the greatest extent possible.

Figure 3:
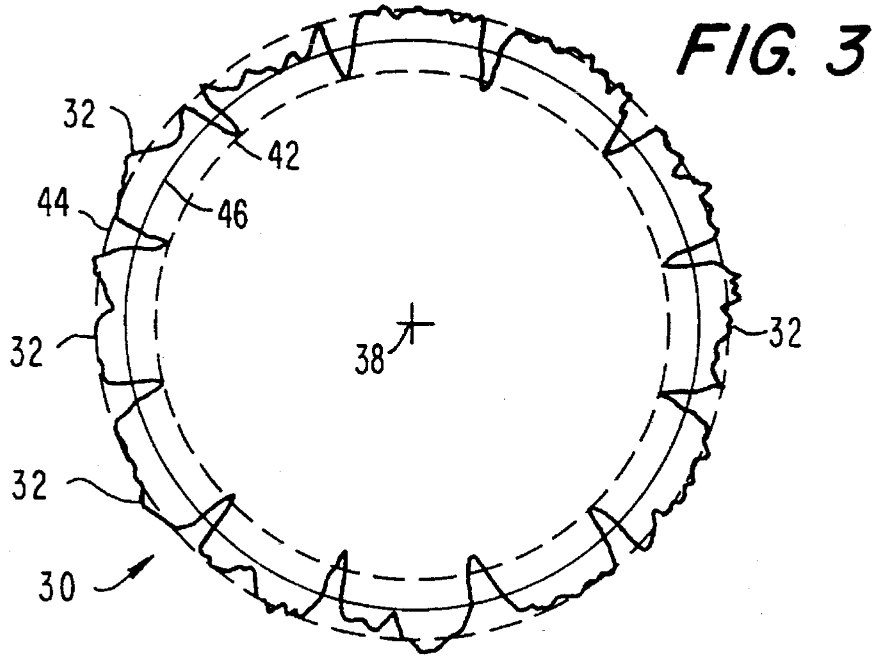
FIG. 3 is another view similar to FIG. 2 with several reference lines added.

This is generally accomplished in the prior art by a first turning operation in which the armature is rotated about shaft 12 while a cutting tool cuts away material from the commutator surface until that surface is round, concentric with shaft 12, and also within inner and outer diameter tolerance limits respectively indicated by broken lines 42 and 44 in FIG. 3. This invention minimizes the amount of material cut away, in part, by permitting varying outer diameters as is described below.

Another undesirable characteristic which can occur in commutators is bar to bar deviation or drop-off of the type shown (possibly somewhat exaggerated) in FIG. 4. In FIG. 4 the cylindrical surface of a small portion of a commutator has been flattened out along a rectilinear path to simplify the illustration and the associated discussion. The bar to bar deviation is measured by the dimension bb in FIG. 4. Although such bar to bar deviation can be present in the commutator prior to any finishing steps, it is troublesome only if it is not removed during finishing or if it is introduced during finishing. For example, a finishing tool moving relative to the commutator in direction 50 may produce bar to bar deviation bb if the tool is not cutting properly because it is not sharp enough or because it is excessively worn.

Still another undesirable commutator characteristic which can result from improper finishing is shown in FIG. 5. In this case material of the left-hand commutator bar 32 has been displaced toward the right-hand commutator bar, thereby at least partly occluding the gap 33 which is supposed to be present between adjacent bars 32. Again, this may result from a worn or broken finishing tool moving relative to commutator 30 in direction 50.

Figure 6:
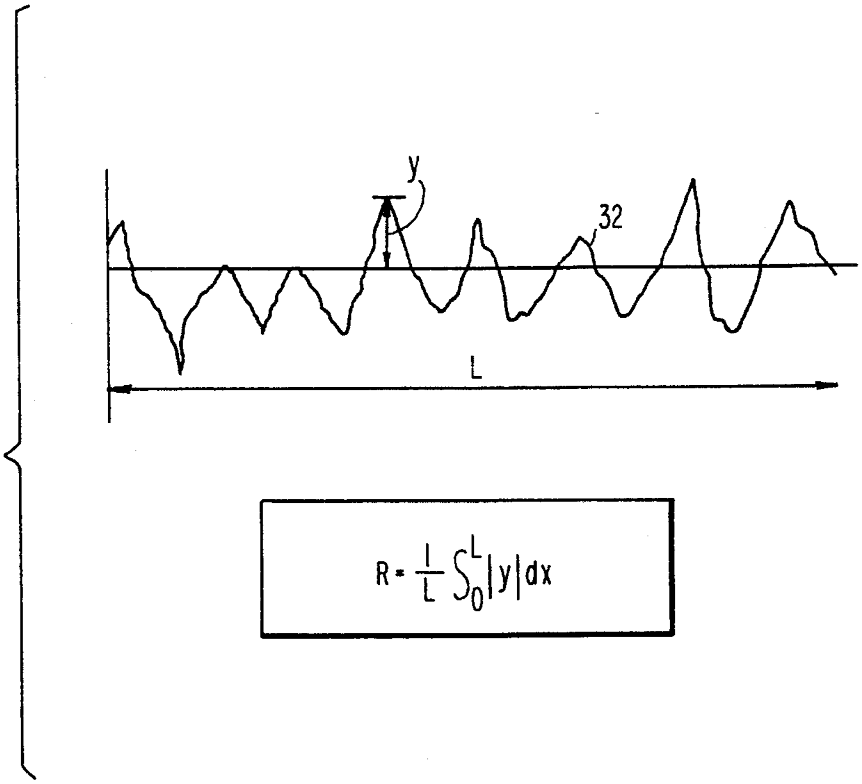
FIG. 6 is a plot, greatly enlarged or exaggerated, of an axial portion of the surface of a finished commutator bar.

As was mentioned in earlier sections of this specification, the finished surface of a commutator should be neither too smooth nor too rough. Accordingly, after roundness and concentricity have presumably been established by the above-mentioned prior art first turning operation, it is customary to subject the commutator to a second turning operation which is intended to leave the commutator surface with a desired roughness. FIG. 6 is a simplified longitudinal profile (possibly somewhat exaggerated) of a typical commutator bar after the second turning operation and therefore showing desired roughness. FIG. 6 also includes a representative formula for computing roughness R (although other conventional formulas may be applied). The desired roughness is typically produced in the above-mentioned second turning operation by rotating the armature about shaft 12 while an appropriately shaped cutting tool engages the commutator surface and moves axially along that surface at a rate which is synchronized with the rate of rotation of the armature. The desired degree of roughness may not be produced in this operation if, for example, the axial motion of the cutting tool is not properly synchronized with the rotation of the armature or if the cutting tool is excessively worn.

Figure 7:
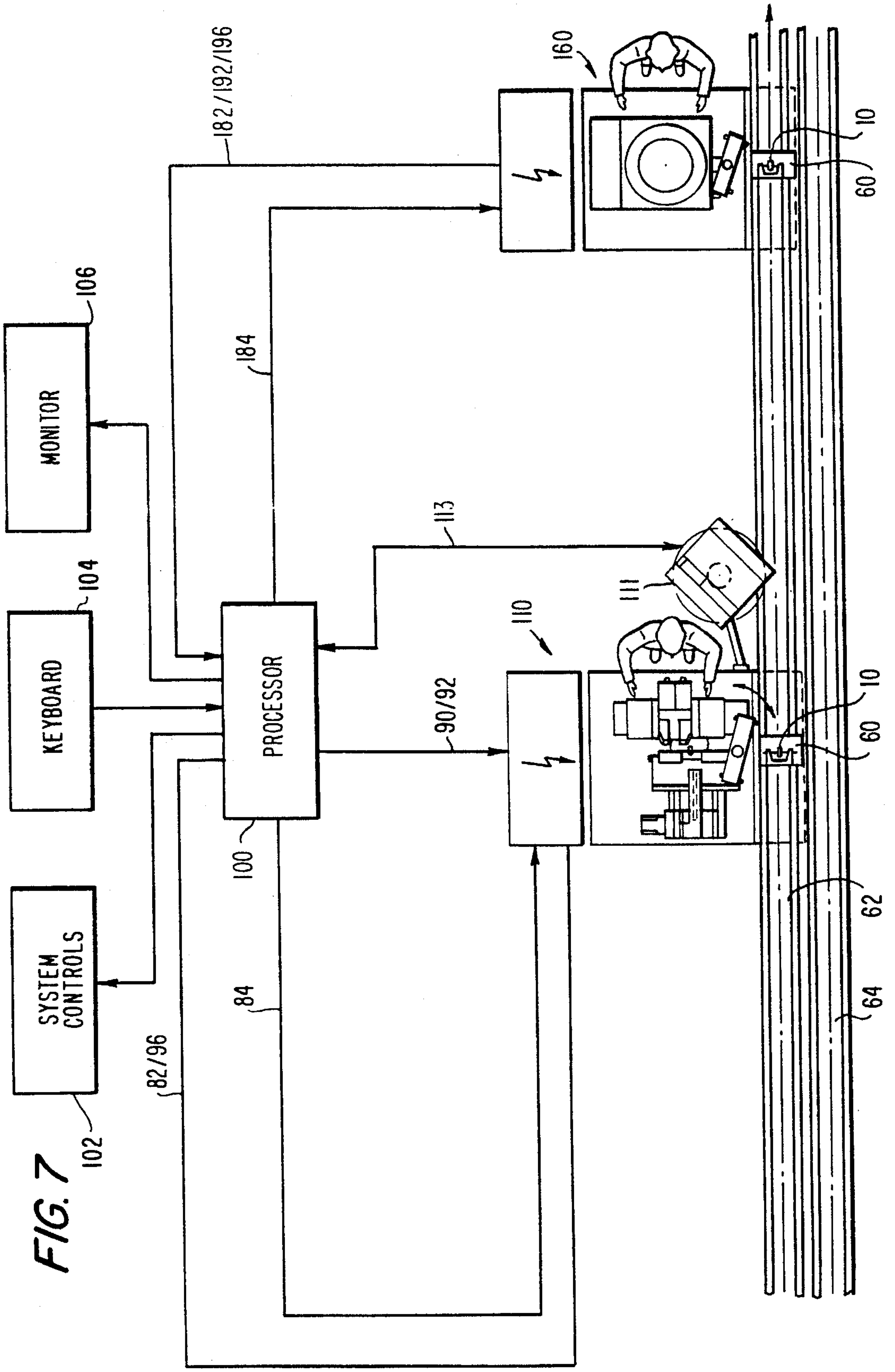
FIG. 7 is a simplified plan view of an illustrative embodiment of commutator surface finishing apparatus constructed in accordance with this invention. Some components are shown in block diagram form in FIG. 7.

FIG. 7 shows an illustrative embodiment of a commutator finishing line constructed in accordance with the principles of this invention for improving the finishing of commutators with respect to surface characteristics of the various types discussed above. Armatures 10 are carried on pallets 60 from station to station from left to right as viewed in FIG. 7 on pallet conveyor 62. Parallel pallet conveyor 64 may be used to convey empty pallets back to an upstream location, to allow loaded pallets to bypass the particular finishing apparatus shown in FIG. 7, or for any other desired purpose.

At processing station 110, each successive armature 10 is removed from its pallet 60 and subjected to a sensing operation which determines its run out characteristic (or at least its minimum radius RMIN) as discussed above in connection with FIG. 2. An illustrative embodiment of suitable sensing apparatus 70 is shown in more detail in FIGS. 8 and 9. In particular, this apparatus includes V-block bearings 112 and 114 for supporting respective opposite end portions of armature shaft 12. While armature 10 is thus supported by V-blocks 112 and 114, bracing belt 116 is pressed against the substantially cylindrical outer surface of lamination stack 14. Motor 118 is then energized to cause bracing belt 116 to rotate armature 10 about the longitudinal axis of shaft 12.

When the rotation of armature 10 reaches a predetermined sensing speed, motor 118 stops accelerating and a sensor 78 (e.g., a conventional optical or laser sensor having a light beam 80 directed toward the cylindrical surface of commutator 30) detects the distance of the portion of the surface of commutator 30 which at any instant is under the head of the sensor from a predetermined reference point associated with the sensor. Sensor 78 produces an output signal indicative of the distance thus detected by the sensor. If plotted in a polar coordinate system, the data indicated by the output signal of sensor 78 might look something like FIG. 2.

The output signal of sensor 78 is applied to processor 100 (FIG. 7) via line 82. Processor 100, which may be a suitably programmed digital computer, analyzes the data represented by this signal in order to at least determine RMIN. If desired, processor 100 can also determine other commutator parameters from this data. For example, processor 100 can determine RMAX to determine whether that value exceeds a predetermined acceptable maximum value RMAXLIM. Processor 100 can perform a similar test on RMIN to determine whether it is less than a predetermined acceptable minimum RMINLIM. Then if either RMAX exceeds RMAXLIM or if RMIN is less than RMINLIM, processor 100 can cause the armature to be rejected.

Rejection of an unacceptable armature can be done in any of several ways, e.g., by sending a signal (via line 84) to processing station 110 to cause that station to discharge the armature in some way other than by returning it to conveyor line 62, by commanding the remaining stations on the line not to process that armature, or by any other suitable part rejection technique). Identifying a defective commutator in this way prior to further processing saves processing time. It also avoids wear on and even possible damage to the processing equipment as a result of attempting to process unacceptable parts. Among the possible commutator or armature defects that can be detected and rejected in the manner just described are bent armature shafts, armature shafts that are not round (e.g., because of lobes or flats on their surfaces), extremely unbalanced armatures, and commutator bars that are not properly secured to the armature.

It will be appreciated that in order to accurately determine such parameters as RMIN, processor 100 may need to analyze the data collected from sensor 78 in such a way as to enable it to exclude from consideration sensor readings associated with the gaps that typically exist between commutator bars 32. This can readily be done, for example, by having processor 100 correlate the sensor data with predetermined mask data. When an optimum correlation is found, the mask allows the processor to ignore sensor readings other than those associated with the surfaces of commutator bars 32.

Assuming that the armature is not rejected as a result of the examination of the commutator performed by components 70 and 100 as described above, RMIN for the commutator has been determined and can be used (if desired) as will now be described to control at least some of the subsequent finishing of the commutator. After examination by sensing apparatus 70, processor 100 further evaluates the armature in order to determine whether turning is required, and if so, what is the minimum cut required to produce an acceptable, high quality, armature. Inspection of commutator 30 may show that the desired roundness and concentricity already exist and that only finishing is required. Even if turning is required, preturning inspection enables the apparatus to cut a minimum amount of material from commutator 30. As such, commutator 30 may be formed with commutator bars that are thinner than those used in traditional armatures and at a more rapid rate.

Figure 10:
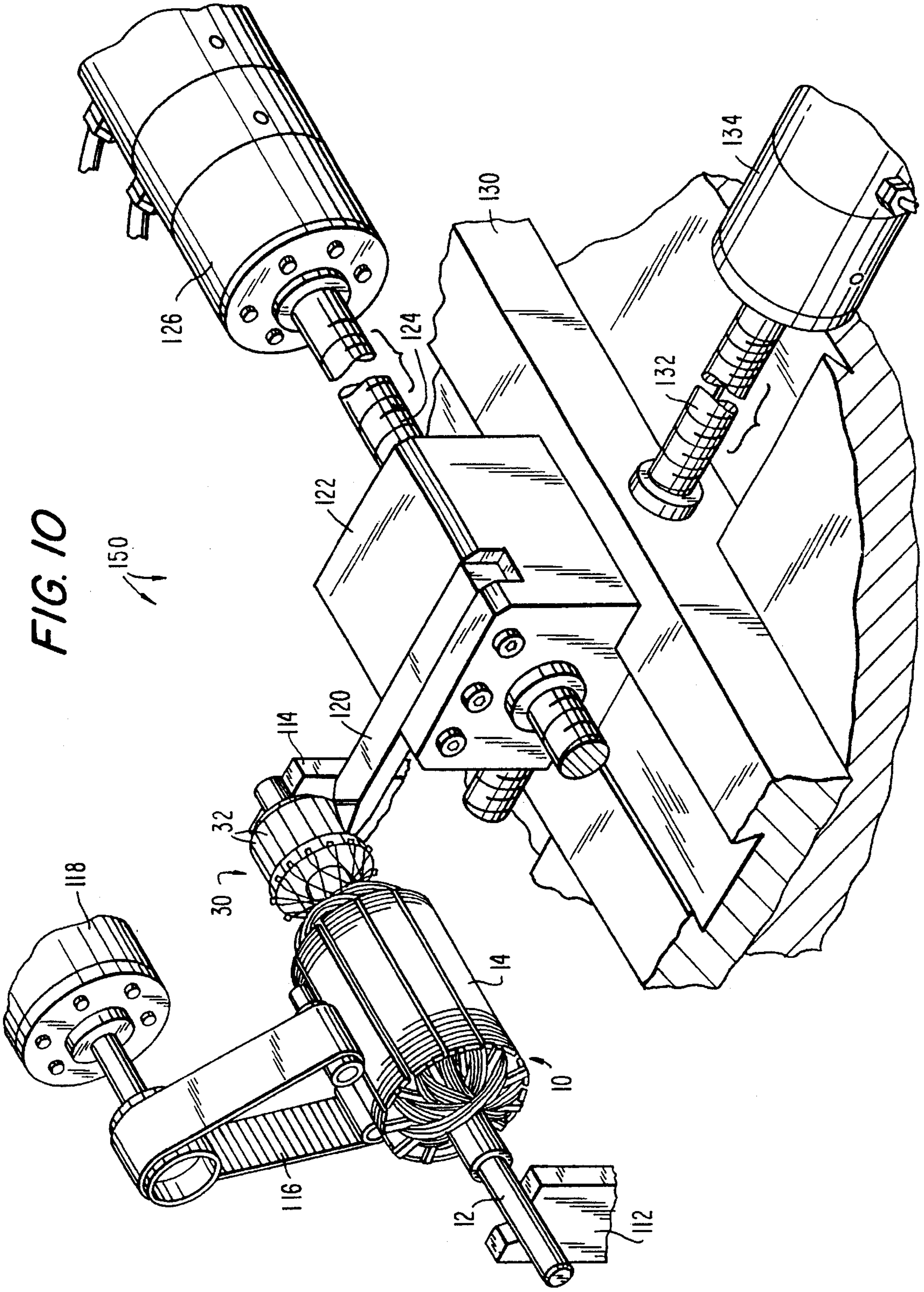
FIG. 10 is an isometric view of an illustrative embodiment of two other portions of the apparatus shown in FIG. 7.

The turning apparatus 150 may be constructed, for example, as shown in FIG. 10 (the exact location of motor 118 is not important, only that it be able to drive bracing belt 116). In addition to turning apparatus 150, processing station 110 may include a keyboard and monitor unit 111 coupled to processor 100 via lead 113. Unit 111 may allow an operator located at station 110 to communicate with processor 100 via the keyboard of unit 111, and may also allow processor 100 to communicate with that operator via the display or monitor of unit 111. Unit 111 may be in addition to or in lieu of keyboard 104 and monitor 106 described in more detail below.

In the illustrative turning apparatus 150 shown in FIG. 10, armature 10 is supported for rotation about the longitudinal axis of shaft 12 by V-block bearings 112 and 114. As previously described, bracing belt 116 is pressed against the cylindrical surface of lamination stack 14. When inspection has determined that turning is required, motor 118 accelerates from sensing speed to turning speed and causes bracing belt 116 to accelerate the rotation of armature about its shaft axis. It will be appreciated that the pause during speed up for inspection and evaluation to occur is almost negligible, further emphasizing one of the advantages of the present invention in combining preturning inspection with the turning operation.

When turning is required, the armature is then accelerated to rotate at an appropriate speed and cutting tool 120 is brought into contact with the cylindrical surface of commutator 30 in order to remove only the minimum material from that surface which is required to ensure that the commutator surface is truly cylindrically round, concentric with shaft 12, and within diameter tolerance limits. An illustrative mounting for tool 120 is shown in FIG. 10 and includes tool holding slide block 122 which can be translated parallel to armature shaft 12 by threaded drive screw 124 rotated by motor 126. Slide block 122 and its control motor 126 are in turn mounted on another slide block 130 which can be translated perpendicular to armature shaft 12 by threaded drive screw 132 rotated by motor 134. As bracing belt 116 rotates armature 10, motor 126 is operated to cause tool 120 to traverse the axial length of commutator 30. Motor 134 is operated to ensure that tool 120 cuts into commutator 30 to the desired depth and no deeper.

In accordance with the present invention, the operation of turning apparatus 150 is preferably at least partly controlled by output signals (on line 90 in FIG. 7) from processor 100. Due to the fact that inspection, turning and finishing all occur in a single station 110, processor 100 can easily apply the data gathered by inspection apparatus 70 to the operation of turning apparatus 150. Processor 100 controls the rotation of the armature by sending signals via connection 84 to motor 118 which drives bracing belt 116. Processor 100 also controls the motion of cutting tool 120 (via motors 126 and 134) relative to the commutator in order to cut the commutator to the desired depth (or finish the commutator if no turning is required).

In particular, processor 100 may control motor 134 so that in station 110 each commutator is cut only by the amount required to give it a diameter approximately equal to twice the value of RMIN determined for that particular armature by sensing apparatus 70. (This assumes, of course, that the diameter given by twice RMIN is less than the maximum permissible diameter indicated by the outer tolerance limit. If not, then processor 100 may control station 110 to cut the commutator to that maximum permissible or a slightly smaller diameter.)

Using the measurement RMIN for each armature to determine the amount by which that armature is cut in station 110 has several advantages. For one thing, it tends to substantially reduce the amount of cutting required, thereby reducing wear on cutting tool 120 and prolonging its life. Further, by reducing the amount of cutting, thinner commutator bars may be used to form commutator 30, thereby causing a substantial reduction in manufacturing costs (i.e., less copper is required for each armature). Also, as previously described, processing time in station 110 may be reduced. And more commutator bar material tends to be left on the armature, thereby producing armatures with potentially longer lives and reducing waste.

Whether an armature has been subjected to the turning operation as described above, every armature must undergo finishing. The purpose of finishing is to give the cylindrical surface of the commutator the desired final roughness R discussed above in connection with FIG. 6. Accordingly, motor 118 varies the rotation of armature 10 to finish speed and cutting tool 120 moves axially along commutator 30 as previously described. Motor 134 (controlled by processor 100 via lead 92 in FIG. 7) is operated to control the cutting depth of tool 120. (In finishing only a relatively shallow cut is typically required.)

To achieve the desired roughness of the cylindrical surface of commutator 30 it is generally important in finishing to synchronize the axial motion of tool 120 (produced by motor 126) with the rotation of the armature (produced by bracing belt 116). This is so because the desired roughness results from helical, thread-like cuts produced in the cylindrical surface of commutator 30 by cutting tool 120. If the pitch of these helical cuts is too small or too large, the finished commutator surface will not have the desired roughness. By controlling both of motors 118 and 126, processor 100 ensures proper synchronization between the rotation of commutator 30 and the axial motion of cutting tool 120.

The depth of the cuts produced by tool 120 in finishing is also very important to producing the desired roughness. Because, in the preferred embodiment being described, processor 100 determined and therefore knows the diameter to which each commutator was cut during turning (if at all), processor 100 can use that information to determine the proper position of slide block 130 during finishing. In particular, processor 100 controls motor 134 to properly position slide block 130 (and therefore cutting tool 120) for each successive armature. In this way enough (but not too much) material is removed from each commutator to produce the desired roughness in the commutator surface. By ensuring that enough material is always removed, consistently high quality commutators are produced. By avoiding removal of more material than is required to produce the desired finished surface characteristics, thinner commutator bars may be used, commutator material is preserved on the armature (thereby again potentially lengthening the life of the armature) and wear on tool 120 is reduced (thereby lengthening the useful life of the tool).

It will be understood that various manufacturing sequences within processing station 110 may be utilized to achieve high quality finishing depending on the circumstances. For example, after an armature has been turned, its rotation may be decelerated to a predetermined sensing speed where sensors 78 and/or 94 can perform a post-turning inspection. Post-finishing inspection conducted within station 110 enables processor 100 to rapidly identify manufacturing problems before a large number of defective armatures have been produced. In such a manufacturing sequence, there is virtually negligible impact to the timing of the manufacturing process caused by the post-inspection pause, because the pause occurs during the normal deceleration of the armature rather than during a separate process step.

Figure 8:
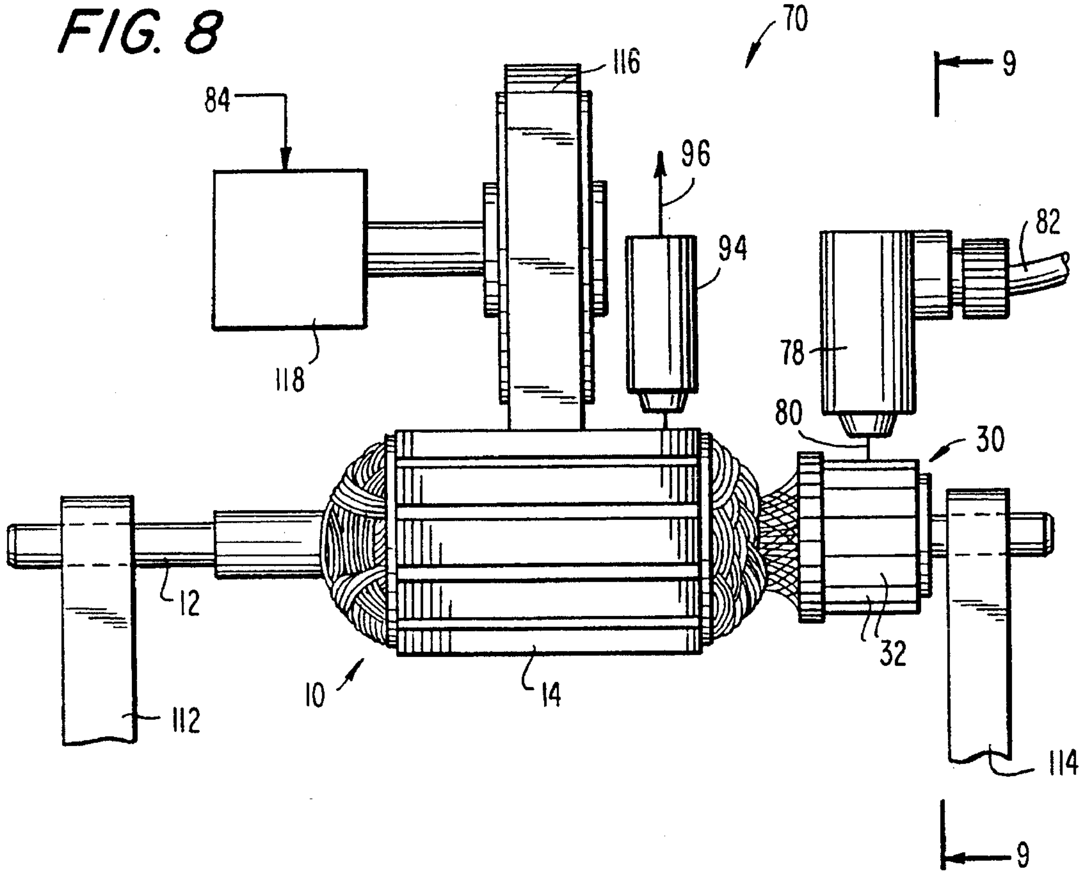
FIG. 8 is an elevational view of an illustrative embodiment of one portion of the apparatus shown in FIG. 7.
Figure 9:
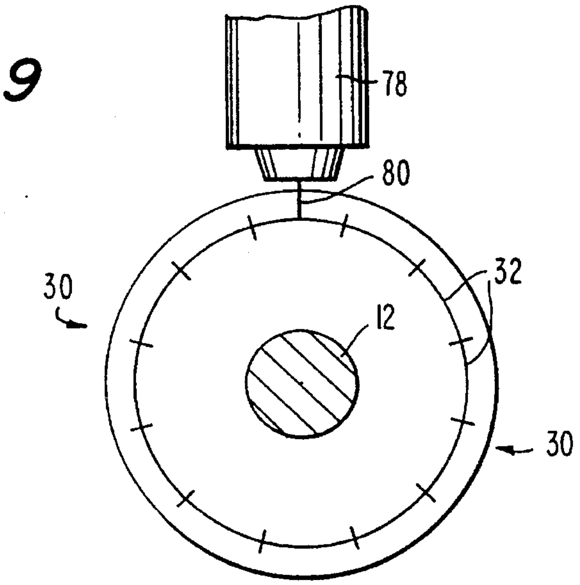
FIG. 9 is a simplified sectional view taken along the line 9—9 in FIG. 8.

In a preferred embodiment of the present invention, additional processing may occur with regard to lamination stack 14, although such processing may not be desired. When such processing is desired, it must occur before any activity related to commutator 30 occurs and only requires an additional sensor and turning apparatus. FIG. 8 shows an additional sensor 94 that is similar to sensor 78, but is associated with lamination stack 14 instead of commutator 30. As previously described in connection with sensor 78, sensor 94 may operate after bracing belt 116 has caused armature 10 to rotate at sensing speed. The output signal of sensor 94 is applied to processor 100 via line 96 (FIG. 7). Processor 100 evaluates the roundness and concentricity of lamination stack 14 to determine whether lamination stack 14 should be turned.

Figure 13:
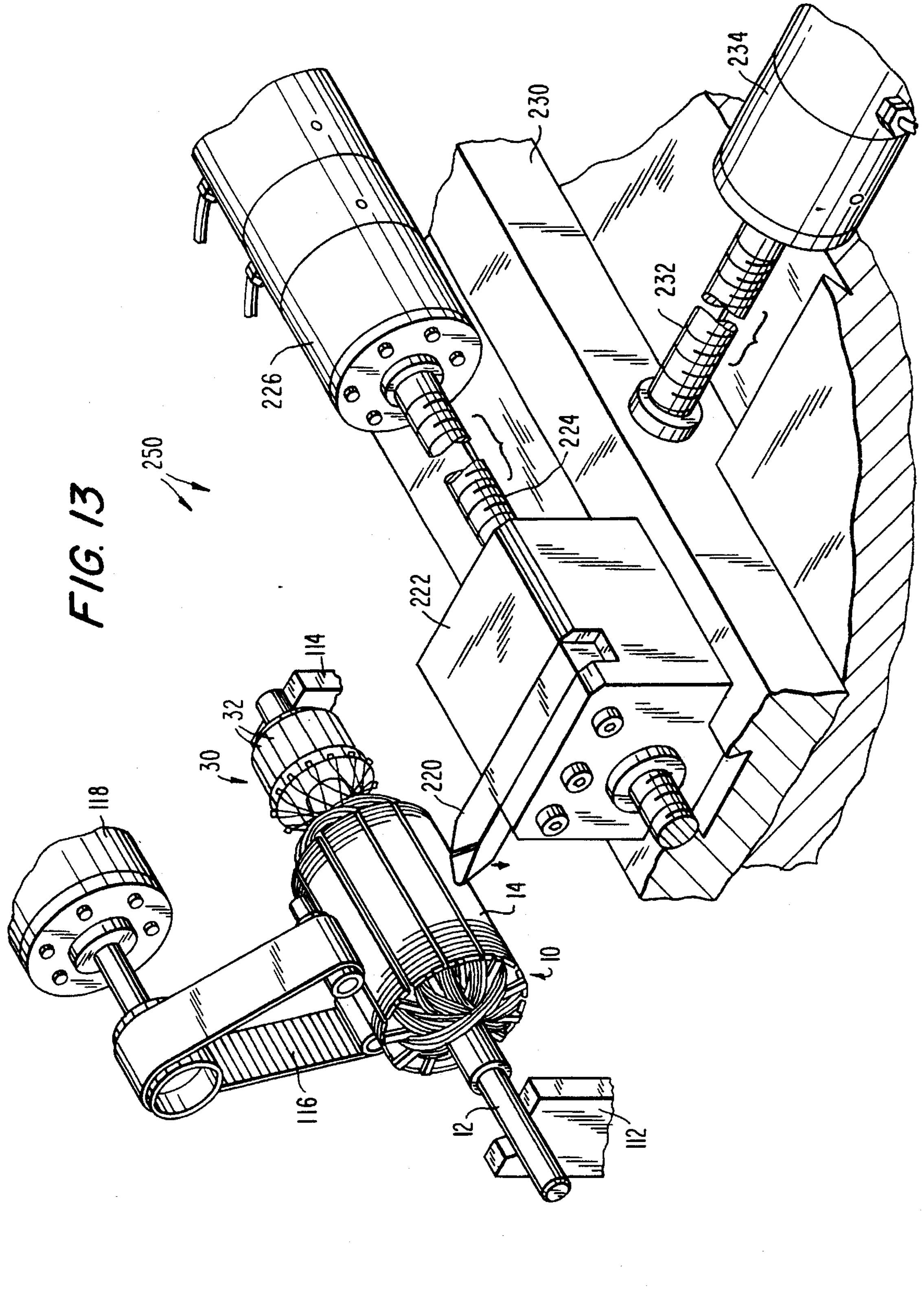
FIG. 13 is an isometric view of an illustrative embodiment of an additional portion of the apparatus shown in FIG. 7.

If processor 100 determines that lamination stack 14 needs to be turned (e.g., to reduce vibration caused by a lobe which exists in stack 14), motor 118 accelerates the rotation of armature 10 to the appropriate turning speed. The turning apparatus 250 shown in FIG. 13 is essentially similar to the apparatus 150 of FIG. 10, except that cutting tool 220 is characterized for cutting lamination stack 14 instead of commutator 30. Accordingly, the elements of FIG. 13 which are similar to the elements of FIG. 10 have reference numerals in FIG. 13 that are increased by 100 from their counterparts in FIG. 10. Cutting tool 220 is mounted in tool holding slide block 222 which can be translated parallel to the armature shaft by threaded drive screw 224 rotated by motor 226. Slide block 222 and its control motor 226 can be translated perpendicular to armature shaft 12 by threaded drive screw 232 rotated by motor 234. The turning operation for lamination stack 14 is performed in essentially the same manner as described in connection with turning commutator 30, and therefore, the description of the turning operation is not duplicated here.

In this configuration, processing station 110 includes two cutting tools 120 and 220 (one for lamination stack 14 and one for commutator 30) which are typically installed next to each other in a horizontal plane which is parallel to the axis of the armature. In some instances, it may be undesirable to turn lamination stack 14, in which case only commutator 30 need be inspected (although, if the configuration of apparatus 210 includes sensor 294, stack 14 is typically inspected anyway and the output signals are merely ignored by processor 100). If lamination stack turning is not desired, processing station 110 may be implemented with a single sensor and turning apparatus without departing from the scope of the invention.

When finishing is complete, the armature is returned to conveyor 62 for transfer to completion station 160. At station 160 the armature is again removed from conveyor 62 and subjected to conventional operations such as brushing with nylon brushes to remove any metal chips that may have been left on the commutator during the cutting operations in station 110. Finishing of the commutator surface is now complete.

Figure 11:
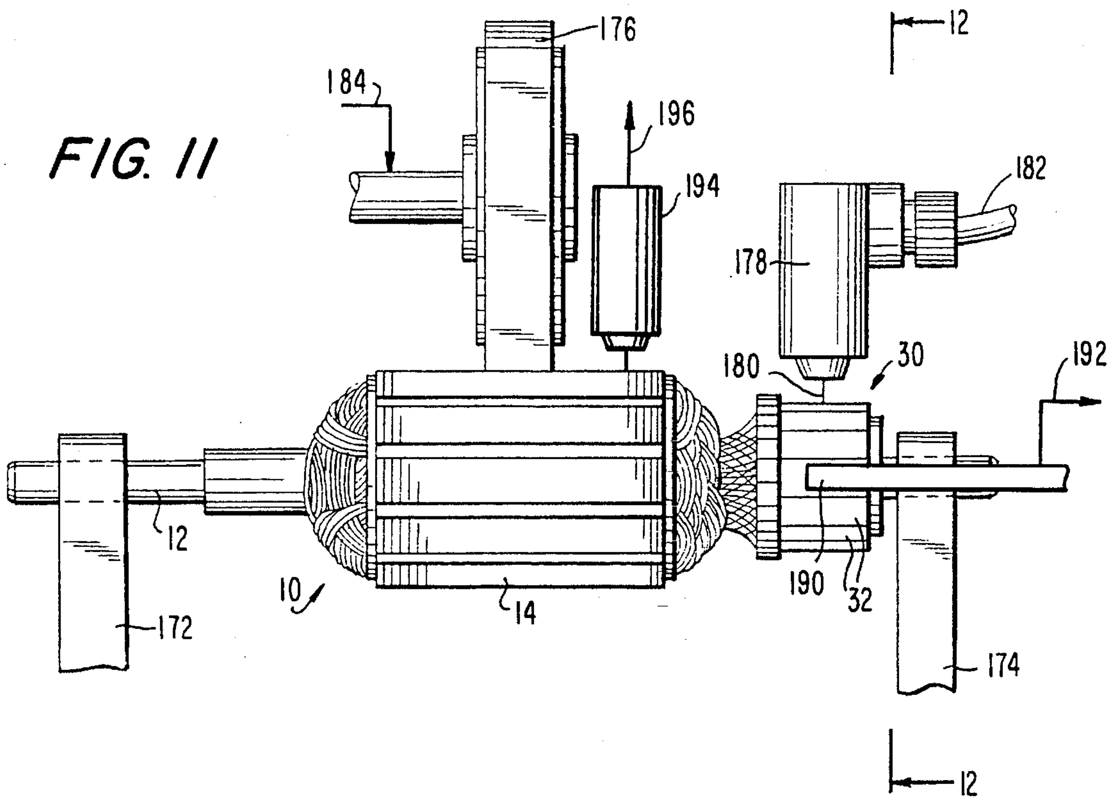
FIG. 11 is an elevational view of an illustrative embodiment of still another portion of the apparatus shown in FIG. 7.
Figure 12:
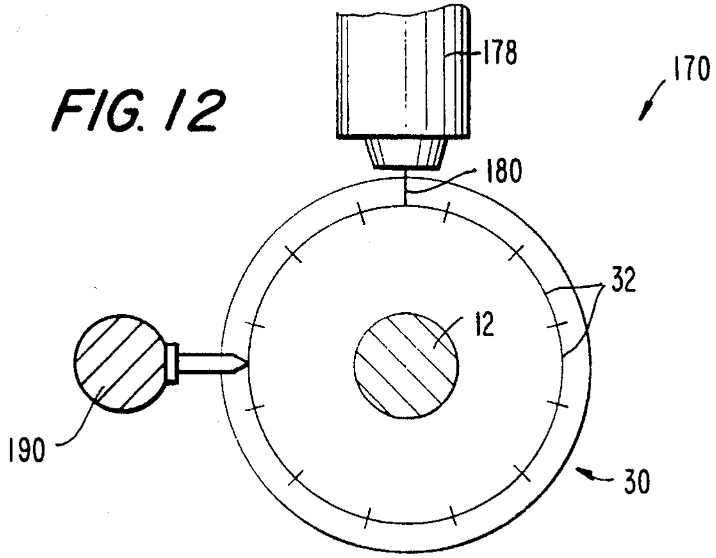
FIG. 12 is a simplified sectional view taken along the line 12—12 in FIG. 11.

After brushing is complete, each armature is again inspected so that the cylindrical surface of the commutator can be verified. Illustrative equipment suitable for use for inspection in station 160 is shown in FIGS. 11 and 12. It will be noted that these Figures are respectively similar to FIGS. 8 and 9, but with the addition of one or two other sensors 190 and 194 which will be described at the appropriate point below. The inspection station elements which are similar to elements in FIGS. 8 and 9 have reference numbers in FIGS. 11 and 12 that are increased by 100 from their counterparts in FIGS. 8 and 9. It will accordingly be necessary to describe these elements again only briefly in connection with FIGS. 11 and 12.

In completion station 160 as shown in FIGS. 11 and 12 the armature is placed in V-block bearings 172 and 174. The rotation speed of commutator is varied (by processor 100 via line 184) to inspection speed by means of friction wheel 176 (as is well known, armature 30 is already rotating from the brushing operation). As the armature is being rotated, optical or laser sensor 178 inspects the surface of commutator 30 in the circumferential direction as described above in connection with FIGS. 8 and 9. The output signal of sensor 178 is applied to processor 100 via connection 182.

Figure 14:
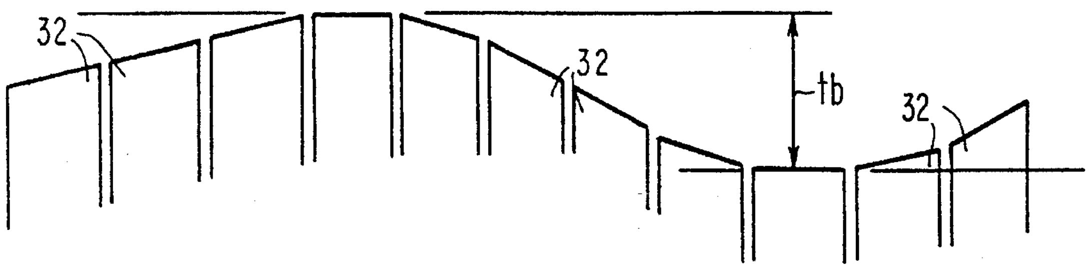
FIG. 14 shows the cylindrical surface of an armature, simplified and linearized in order to illustrate another type of defect which can remain after finishing or which can occur during finishing.

Processor 100 analyzes the output signal of sensor 178 for such purposes as ensuring that the cylindrical surface of commutator 30 is acceptably round, concentric with shaft 12, and within the acceptable diameter limits discussed above in connection with FIG. 3. For example, the output signal of sensor 178 may indicate that the surfaces of commutator bars 32 are not a constant distance from a reference point associated with sensor 178. Often in such cases, the cylindrical surface of commutator 30 is seen as a sinusoidal curve as is indicated in FIG. 14. Processor 100 applies at least one sine wave to the output signal of sensor 178 looking for a match on at least a portion of the output signal. If there is no match (i.e., the output signal is flat), the surface of commutator 30 is acceptably round. Otherwise, processor 100 analyzes the applied sine wave in order to determine the minimum and maximum amplitudes. The difference between the minimum and maximum amplitude is calculated to be the dimension tb (as shown in FIG. 14). The commutator is not acceptable if dimension tb is found to be excessive. An unacceptably large dimension tb may be due to such defects as (1) lack of concentricity between the cylindrical surface of the commutator and shaft 12, (2) flats or lobes on the nominally cylindrical surface of shaft 12, or (3) an unbalanced armature.

Processor 100 may also compare the detected diameter of the commutator with the diameter to be expected based on where the processor located slide block 130 (FIG. 10) in processing station 110. Processor 100 also preferably checks the output of sensor 178 for unacceptable or incipiently unacceptable conditions such as those shown in FIGS. 4 and 5 and described above. For example, processor 100 can detect a condition like that shown in FIG. 4 when (with sensor 178 scanning in direction 50) the commutator surface does not come back to substantially the same level after the gap 33 which occurs between adjacent commutator bars 32. Processor 100 can detect a condition like that shown in FIG. 5 when (again with sensor 178 scanning in direction 50) the expected fully developed gap 33 does not occur between adjacent commutator bars 32 because much of that gap is shaded or occluded by material displaced from left-hand commutator bar 32 toward right-hand commutator bar 32. Thus the width or depth of gap 33 only appears to sensor 178 and processor 100 to be the relatively small dimension wg or dg in FIG. 5, and the unacceptable or incipiently unacceptable condition shown in that Figure is thereby detected.

Either before or after sensor 178 has been operated as described above (but it is most advantageous for sensor 190 to operate after sensor 178 has been operated because the brushing operation will have been performed), sensor 190 is operated with the armature rotationally stationary and oriented angularly so that sensor 190 operates on a commutator bar 32, not a region or gap 33 between adjacent bars. (Sensor 178 and processor 100 can cooperate to find a suitable angular position of the armature for this purpose. This angular position can then be established and held by operation of friction wheel 176 under the control of processor 100 via lead 184.)

In the illustrative embodiment shown in FIGS. 11 and 12, sensor 190 is a highly sensitive mechanical feeler, probe, or stylus which contacts the surface of a commutator bar 32 and moves axially along that bar for a distance L. Sensor 190 produces an output signal on lead 192 indicative of the contour of the commutator bar surface it contacts. If plotted, the output signal of sensor 190 might look like the line 32 in FIG. 6. The output signal of sensor 190 is applied to processor 100 for analysis by the processor to ensure that the commutator surface has acceptable roughness R. For example, processor 100 may use a relationship of the type shown in the box in FIG. 6 (the given relationship is based on the centerline average principle, which is well known in the art, but other common relationships may also be applied to determine R) in this analysis. Processor 100 may then compare the thus-computed value of R to predetermined acceptable upper and lower threshold values for the roughness parameter.

If the cylindrical surface of lamination stack 14 has been turned as described above in connection with the possible inclusion in station 110, then completion station 160 may also include another sensor 194 similar to sensor 178 but positioned for sensing the cylindrical surface of lamination stack 14. The output signal of sensor 194 is applied to processor 100 via lead 196. Processor 100 may analyze the data represented by this signal in a manner similar to the above-described analysis performed by processor 100 on the output signal of sensor 178 in order to inspect the cylindrical surface of lamination stack 14 for such properties as proper diameter and concentricity with armature shaft 12.

Sensors suitable for use sensing operations in stations 110 and 160 are commercially available from such suppliers as Rank Taylor Hobson Limited, of Leicester, England, and Rodenstock Precision Optics, Inc. of Rockford, Ill.

Any or all of the data from sensors 178, 190 and 194, collected and analyzed by processor 100 as described above, may be used by processor 100 in any of several ways and for any of several purposes. For example, if the data does not indicate that the commutator is acceptable, the armature may be rejected (e.g., by an appropriate command given to completion station 160 via lead 184 or by a similar command given to overall machine control 102). An appropriate malfunction indication may also be given to the human operator of the system (e.g., via an appropriate display on monitors 106 and/or 111). Alternatively, if the commutator is acceptable but not completely as expected, the armature may be accepted while the operator is alerted (again via monitors 106 and/or 111) to the possibility that a problem may be developing. Processor 100 may also be programmed to attempt to automatically adjust the system to correct or compensate for problems that are detected. For example, if the diameter of the finished commutator is found by sensor 178 and processor 100 to be acceptable but larger than expected, this may mean that the cutting edge of tool 120 in processing station 110 is somewhat worn away. Processor 100 may attempt to compensate for this by modifying the relationship between RMIN as determined during inspection in station 110 and the location established for slide block 130 in turning apparatus 150 so that tool 120 in station 110 will be set somewhat closer to armature shaft 12 for any given value of RMIN. The following is a table of illustrative system responses to this and other representative commutator surface deficiencies that may be detected by processor 100 based on analyzing the output signals of sensors 178 and 190.

TABLE I

| Problem | Possible Causes(s) | System Response(s) |
|---|---|---|
| Commutator diameter acceptable but larger than expected. | Cutting edge of tool 120 in station 110 wearing away. | Adjust relationship between RMIN determined during preturning inspection and location of slide block 130 in station 110 to set cutting edge of associated tool 120 closer to shaft of successive armatures; alert operator to impending need to replace tool. |
| Commutator diameter outside acceptable range. | Tool 120 in station 110 worn or broken. | Reject armature; stop machine; alert operator to replace tool. |
| Bar to bar deviation bb as shown in FIG. 4 acceptable but trending toward limit of acceptability. | Commutator bar not properly secured to armature. | Alert operator to inspect commutator for improperly secured commutator bar; if this is not the cause, consider next possible cause. |
| | Tool 120 in station 110 not sufficiently sharp, improperly prepared, or excessively worn. | Alert operator to impending need to replace tool 120 in station 110. |
| Unacceptable bar to bar deviation bb as shown in FIG. 4. | Commutator bar not properly secured to armature. | Reject armature; alert operator to inspect commutator for improperly secured comutator bar; if this is not the cause, consider next possible cause. |
| | Tool 120 in station 110 not sufficiently sharp, improperly prepared, or excessively worn. | Stop machine; alert operator to replace tool 120 in station 110. |
| Shading of bar to bar gap as shown in FIG. 5 acceptable but trending toward limit of acceptability. | Commutator bar not properly secured to armature. | Alert operator to inspect commutator for improperly secured bar; if this is not the cause, consider next possible cause. |
| | Tool 120 in station 110 broken or otherwise defective. | Alert operator to impending need to replace tool 120 in station 110. |
| Unacceptable shading of bar to bar gap as shown in FIG. 5. | Commutator bar not properly secured to armature. | Reject armature; alert operator to inspect commutator for improperly secured commutator bar; if this is not the cause, consider next possible cause. |
| | Tool 120 in station 110 broken or otherwise defective. | Stop machine; alert operator to replace tool 120 in station 110. |

TABLE I-continued

| Problem | Possible Causes(s) | System Response(s) |
|---|---|---|
| Roughness parameter R acceptable but trending toward limits of acceptability. | Axial motion of tool 120 in station 110 not properly synchronized with armature rotation. | Adjust relationship between rate of axial motion of tool 120 in station 110 and rotation of armature; if this is not the cause, consider next possible cause. |
| | Cutting edge of tool 120 in station 110 wearing away. | Adjust relationship between RMIN determined during preturning inspection and location of slide block in station 110 to set cutting edge of associated tool 120 closer to shaft of successive armatures; alert operator to impending need to replace tool. |
| Roughness parameter R unacceptable. | Tool 120 in station 110 excessively worn or broken. | Reject armature; stop machine; alert operator to change tool 120 in station 110. |
| Unacceptable circumferential bar surface deviation tb as shown in FIG. 14. | Flats or lobes on shaft 12. | Reject armature; alert operator to inspect armature shaft for flats or lobes on shaft 12; if this is not the cause, consider next possible cause. |
| | Armature surface not concentric with shaft 12. | Reject armature; alert operator to inspect armature for cause of non-concentricity and to take appropriate action. |

Processor 100 may respond similarly to defects in the cylindrical surface of lamination stack 14 detected by analysis of the output signal of sensor 194 if sensor 194 is provided. For example, processor 100 can use the output of sensor 194 to detect wear of the lamination stack turning tool and to cause timely intervention to automatically adjust or manually replace that tool.

In response to several possible problems, Table I refers to stopping the machine. This can be done by an appropriate command from processor 100 to overall system controls 102. Table I also refers to rejecting armatures under certain conditions. As has been mentioned, this can be done by an appropriate command to completion station 160 or to rejection apparatus (not shown) which can be downstream from station 160 along conveyor 62. The operator "alerts" mentioned in Table I are provided by way of monitors 106 and/or 111, which can be augmented, if desired, by more highly visible lights or audible alarms.

It will be noted that in addition to providing feedback or outputs that are usable in controlling the operation of the commutator finishing apparatus per se, the system may also provide outputs that are useful in monitoring other aspects of the armature production process. For example, among the "System Responses" in Table I are "alerts" that prompt the operator to check for such problems as inadequately secured commutator bars. Other such "alerts" may be provided to prompt the operator to check other factors that may be affecting commutator finishing quality in various ways. Such other factors may include armature shaft straightness, commutator placement in general, coil winding operations, coil lead fusing operations, etc.

Table I refers in several instances to detecting conditions which, while still acceptable, are trending toward unacceptability. Processor 100 can be programmed to detect such trends using statistical quality control methods. For example, for each parameter to be inspected, processor 100 may collect data in the nature of a histogram of the values of that parameter detected in station 160 (see, for example, the typical histogram shown in FIG. 15). From this histogram data, processor 100 may compute such statistically significant values as an average (mean) value and a standard deviation ($\sigma$).

Figure 16:
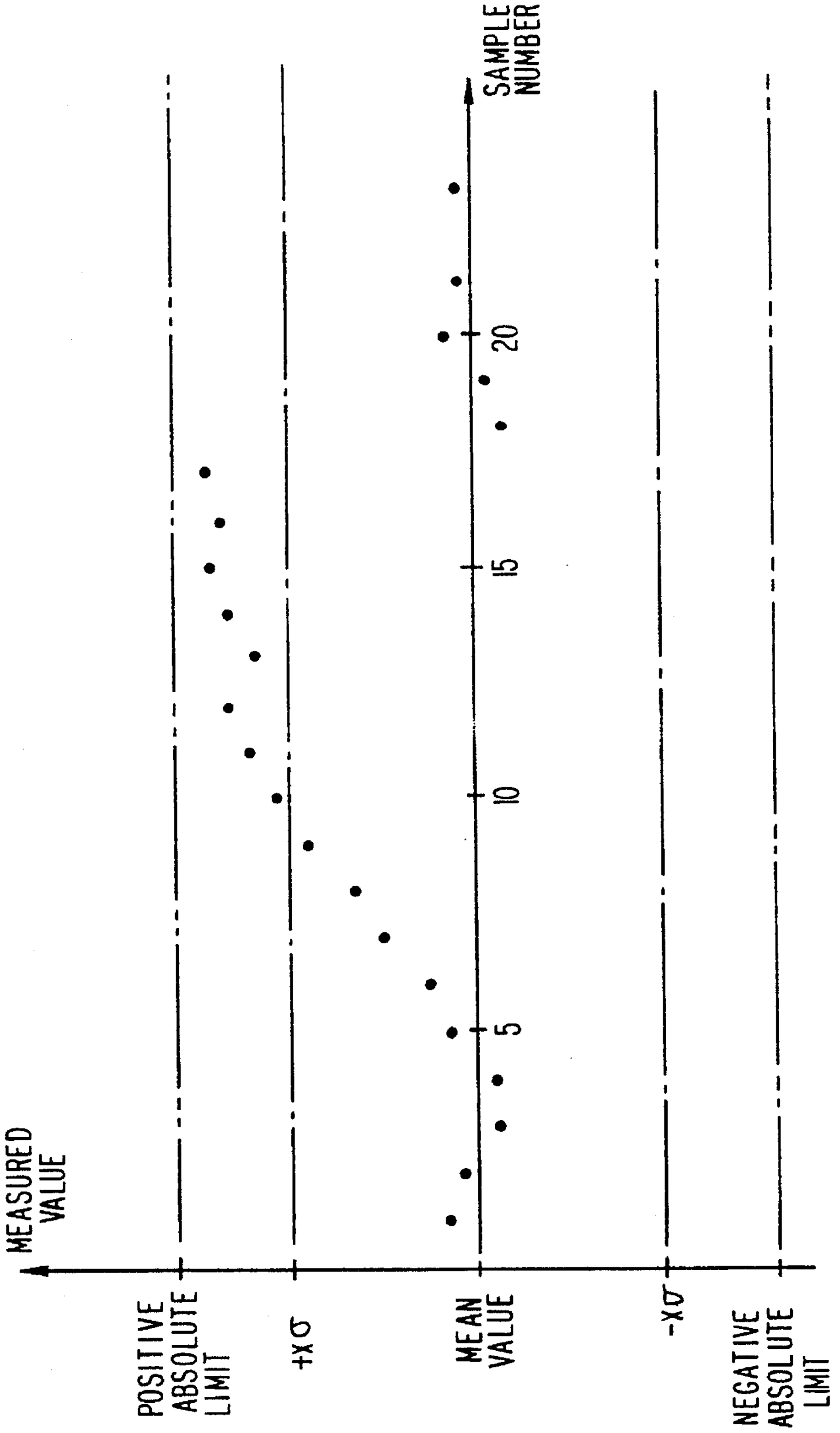
FIG. 16 is a plot of representative data collected by the apparatus of FIG. 7.

Processor 100 may then detect a trend in one direction or another when several successive values of a parameter are detected in station 160 which deviate from the mean by more than a predetermined (whole and/or fractional) number of standard deviations. In the illustrative data plotted in FIG. 16, for example, processor 100 may identify a trend at about sample number 15 because there have then been several successive samples greater than x times $\sigma$ from the mean value. Corrective action can then be taken (e.g., as in Table I) based on the nature and direction of the trend thus detected. As shown in FIG. 16, for example, this corrective action results in sample 18 and subsequent samples again being much closer to the mean value. In addition, absolute limits of acceptability may be established either at higher numbers of standard deviations from the mean and/or as fixed threshold values entered into processor 100 via keyboard 104. Any commutator having a parameter value which is not within these absolute limits of acceptability is rejected. In FIG. 16, for example, sample 22 has a value below the negative absolute limit, and so that part is rejected.

It will be appreciated that the above-described system, including automatic adjustment of the commutator finishing station based on in-line inspection of current production, and possibly also including statistical quality control and analysis as described above, enables the systems of this invention to produce better and more consistent results, and also extends the usable life of the tooling employed. These systems also reduce the number of defective parts produced, e.g., by automatically correcting conditions that may be trending toward the production of defective parts, by giving the operator of the system advance warning that tooling is in need of replacement, by automatically stopping the machine as soon as a truly defective part is detected, etc.

Figure 17:
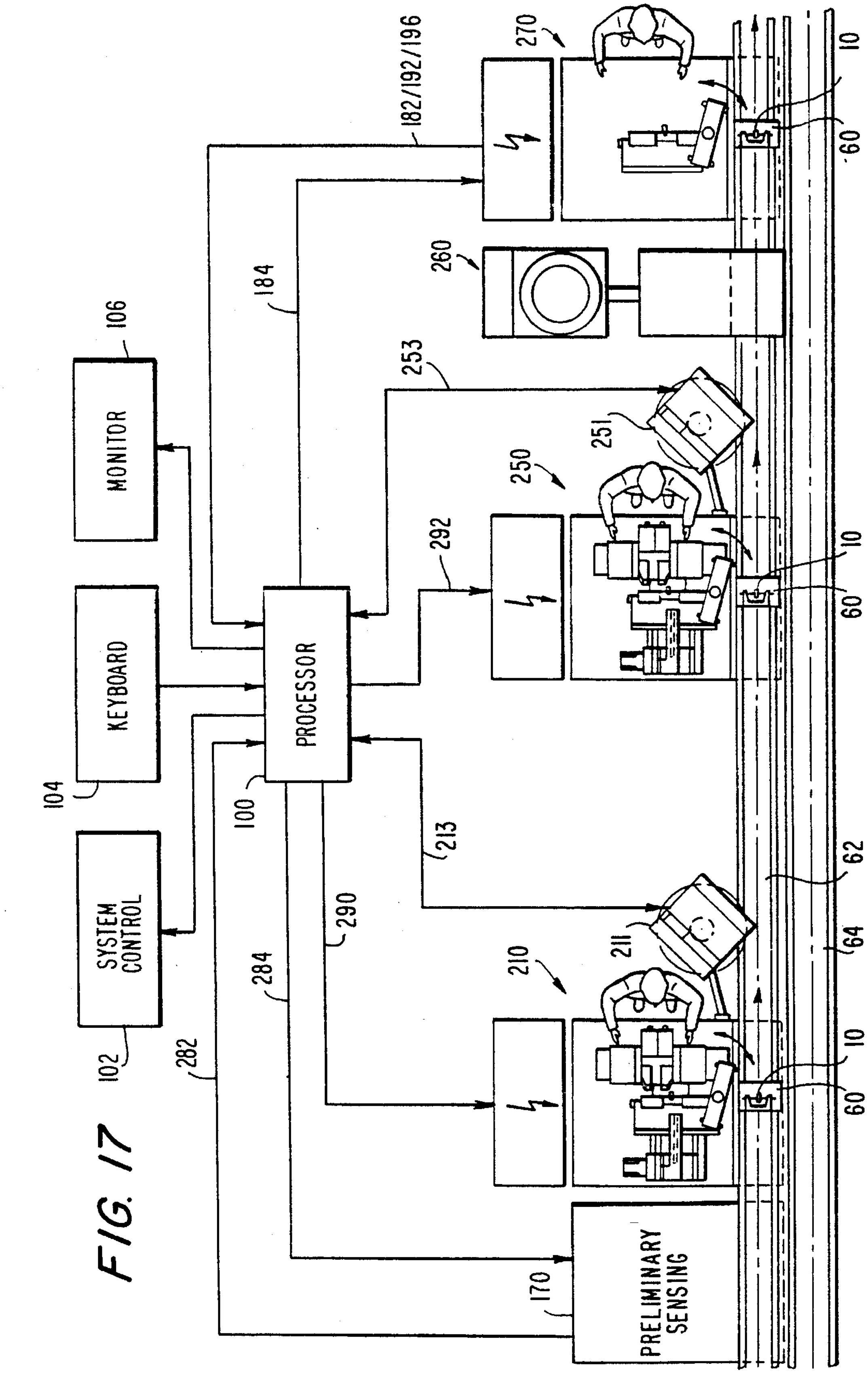
FIG. 17 is a simplified plan view of an alternative illustrative embodiment of commutator surface finishing apparatus constructed in accordance with this invention. Some components are shown in block diagram form in FIG. 17.

FIG. 17 shows a possible alternative layout to the one shown in FIG. 7 where the principles of the present invention could be utilized to improve an existing commutator finishing apparatus. It will be noted that FIG. 17 represents apparatus having essentially the same functionality as that shown in FIG. 7, therefore, like components are similarly numbered and will only be described briefly in connection with FIG. 17. However, the apparatus of FIG. 17 will not be able to manufacture armatures as rapidly as the apparatus of FIG. 7 (due at least to the additional load/unload requirements), but the installation of a preliminary sensing station coupled to the processor which operates the turning stations enables the apparatus of FIG. 17 to finish armatures with a minimum amount of turning (and therefore, the armatures may be assembled with thinner commutator bars).

In FIG. 17, a preliminary sensing station 170 has been added which performs the functions of sensing apparatus 70 in processing station 110 (FIG. 7). Preliminary sensing station 170 may even use the identical components shown in FIGS. 8 and 9 to inspect armature 30 (where signal lines 282 and 284 of FIG. 17 are functionally the same as signal lines 82 and 84 of FIG. 7). After preliminary sensing is complete, armature 30 is loaded onto pallet 60 and moved down conveyor 62 to a first turning station 210, where it is typically unloaded.

First turning station 210, which at least provides commutator turning, may also provide lamination stack turning (using an apparatus similar to the apparatus shown in FIG. 13 and described above) to cut lamination stack 14 before commutator 30 is cut in order to improve the balance of armature 10. The more balanced armature 14 is during cutting, the more accurate the cutting procedure is, which permits commutator bars 32 to be manufactured with less material (i.e., less material will need to be cut away). In such a configuration, first turning station 210 includes two cutting tools 120 and 220 (one for lamination stack 14 and one for commutator 30) which are typically installed next to each other in a horizontal plane which is parallel to the axis of the armature. All turning for the apparatus shown in FIG. 17 is performed in the manner previously described in connection with FIGS. 10 and 13.

First turning station 210 further includes the capability to use data from preliminary sensing station 170 to improve the turning operation in order to minimize the cuts taken from the stack and armature. Also, by using sensing data from station 170, processor 100 may even cause an armature to bypass turning station 210 if turning is unnecessary. Once again, this provides the advantage that a minimum amount of material may be used for each commutator bar 32. Turning station 210 also includes monitor 211, which is connected to processor 100 via line 213, providing the same functions as monitor 111 in FIG. 7. Also, processor 100 commands station 210 via line 290 in a manner similar to line 90 (FIG. 7).

After turning station 210 has completed its operation (or has been bypassed), armature 30 is loaded onto pallet 60 and moved down conveyor 62 to a second turning station 250, where it is unloaded for finishing. The finishing operation which occurs in turning station 250 is essentially identical to the finishing operation previously described, except that turning station 250 only performs finishing. Therefore finishing in station 250 is only described briefly. Station 250 includes a monitor 251 which is connected to processor 100 via line 253 in the same manner as monitor 111 and line 113 of FIG. 7. Processor 100 controls the finishing operation in station 250 via signals along line 292 (versus line 92 in FIG. 7).

When the finishing is complete, armature 30 is again loaded onto pallet 60 and moved along conveyor 62. At brushing station 260, armature is unloaded and nylon brushes are applied to the armature to remove any metal chips that may have been left on the commutator during the cutting operations in stations 210 and 250. Finishing of the commutator surface is now complete and the armature is returned to pallet 60.

Figure 15:
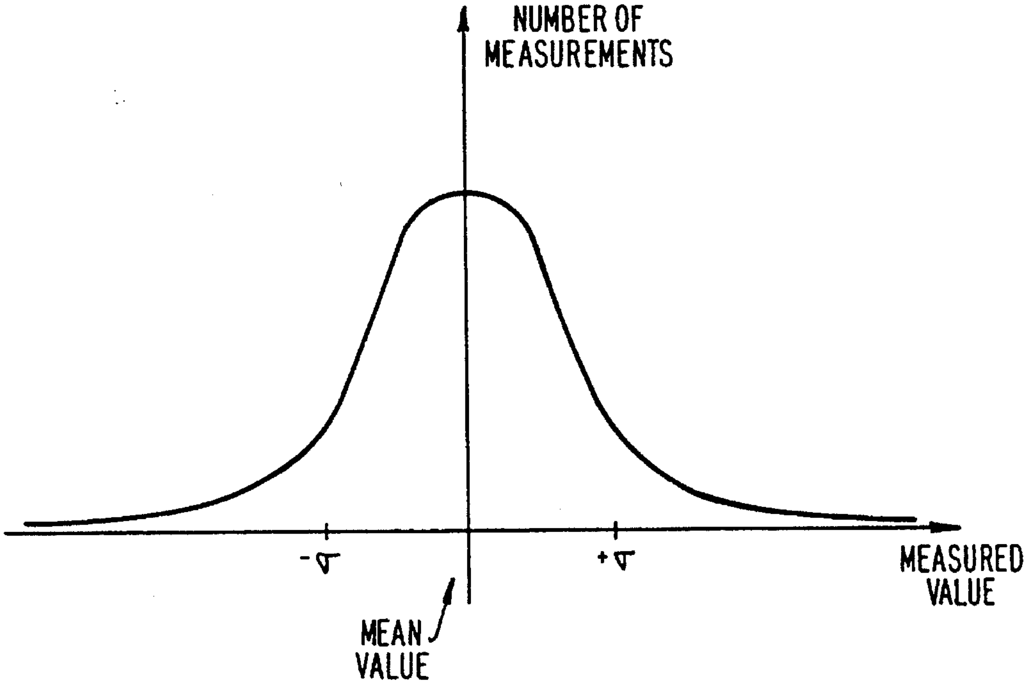
FIG. 15 is a histogram of typical data collected by the apparatus of FIG. 7.

The apparatus of FIG. 17 also includes the functionality of inspection apparatus of station 160 (FIG. 7) in inspection station 270, which provides the apparatus of FIG. 17 with the capability to collect and analyze data similar to the data shown in FIGS. 15 and 16. Inspection station 270 includes sensors 178, 190 and 194 as previously described in connection with FIGS. 11 and 12. Station 270 operates via commands from processor 100 along line 184. Processor 100 receives data from station 270 via lines 182, 192 and 196 (as shown in FIGS. 11 and 12). Processor 100 collects data from the apparatus of FIG. 17 and analyzes it to provide the same in-line system performance improvement capability as previously described.

Figure 18:
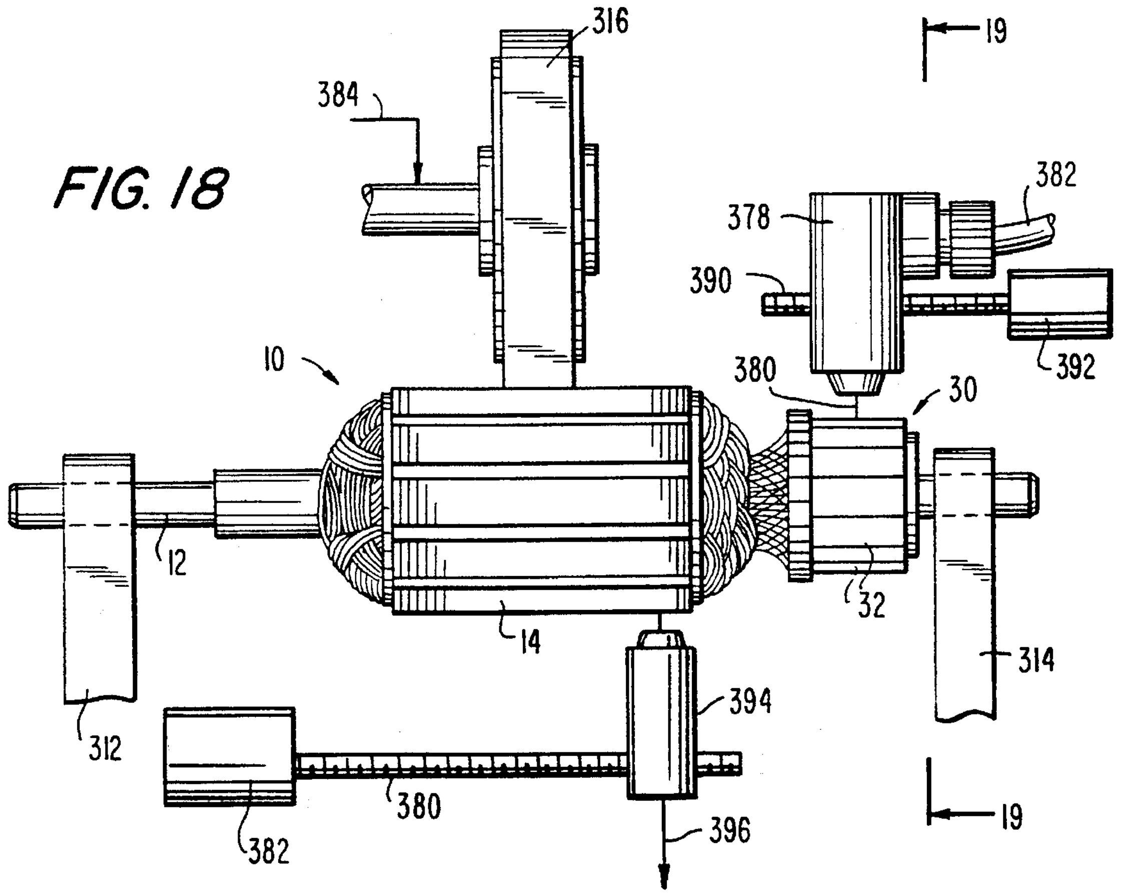
FIG. 18 is an elevational view of an illustrative embodiment of another portion of the apparatus shown in FIG. 17.
Figure 19:
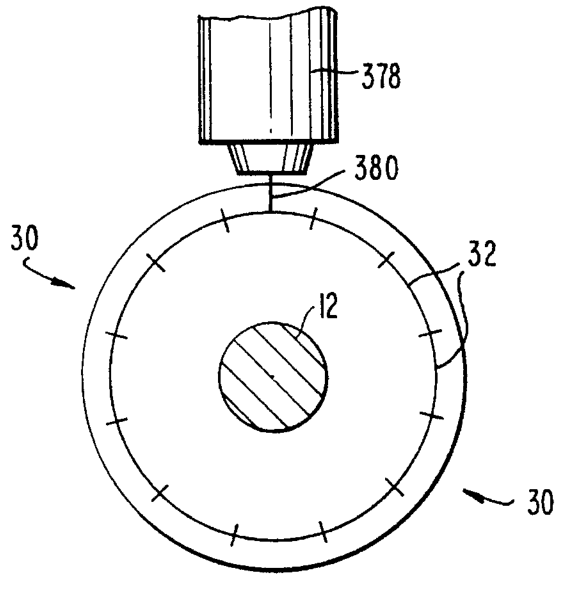
FIG. 19 is a simplified sectional view taken along the line 19—19 in FIG. 18.

FIGS. 18 and 19 show a more particular embodiment of the present invention in which the sensors which are used to inspect the commutator and lamination stack are implemented such that they move axially, parallel to the shaft of the armature, during inspection. In this manner, the inspection process more fully senses and inspects the surfaces of the commutator and/or lamination stack. It will be appreciated that the advantages of axial movement of the inspection sensors may be applied in whole or in part to any of the previously described configurations. In view of this, the elements relating to inspection in FIGS. 18 and 19 all have reference numerals in the 300's, but are otherwise similarly numbered (e.g., sensor 378 could be substituted for sensor 78 in FIGS. 8 and 9, or sensor 178 in FIGS. 11 and 12, or sensor 278 in FIGS. 19 and 20).

As previously described, armature 12 is supported for rotation by V-block bearings 312 and 314. Armature 12 is rotated by drive 316 (which may be either a friction wheel, a bracing belt, or other conventional means) based on input signals from processor 100 via connection 384. Sensors 378 and 394 inspect the circumferential surfaces of commutator 30 and lamination stack 14 and provide signals which are used to determine roundness and concentricity.

To more fully inspect the surfaces (i.e., commutator 30 and stack 14), sensors 378 and 394 may move axially along the entire length of the commutator and lamination stack, respectively, while the armature is being rotated. The axial movement, in combination with the rotation of the armature will cause the inspection scan to be a helical survey of the appropriate surface, rather than the previously described cylindrical survey. The axial movement may be controlled by threaded drive screws 380 and 390 (which are rotated by control motors 382 and 392, respectively) or the movement may be controlled by other conventional means, such as an actuator driven system. For instance, sensor 378 may be mounted to slide block 122 parallel to the longitudinal axis of cutting tool 120 (FIG. 10) and sensor 394 may be similarly mounted to slide block 222 parallel to longitudinal axis of cutting tool 220 (FIG. 13). Alternatively, a stripe laser sensor may be used in place of the previously described sensor 378 or 394 which would not require movement to inspect the corresponding surface because a stripe laser sensor can apply a single laser beam along the entire length of the object being inspected. Additionally, a series of fixed sensors similar to those previously described could be used to more fully inspect the appropriate surface.

It will be understood that the foregoing is only illustrative of the principles of this invention, and that various modifications can be made by those skilled in the art without departing from the scope and spirit of the invention. For example, additional inspection (e.g., like that performed by sensor 78 in FIGS. 8 and 9 or by sensor 178 in FIGS. 11 and 12) can be performed between stations 210 and 250 to even more quickly detect problems occurring in station 210. This might also simplify the problem analysis performed by processor 100 because there would be no issue as to which turning station had caused a problem detected at that point. Additional inspection after station 210 would also prevent unacceptable parts from reaching station 250 where those parts might damage the station 250 apparatus. It will also be apparent to those skilled in the art that "turning" operations as that term is employed herein can be performed in ways other than as shown in the accompanying drawings and described above. For example, as an alternative to the embodiment shown in FIG. 10, the slide channel for slide block 122 could be oriented perpendicular to the axis of shaft 12 and screw 132 could act directly on block 122. Block 122 and motor 134 would then be mounted on a second slide block slidable parallel to the axis of shaft 12 by screw 124 and motor 126. As yet another alternative to the depicted turning apparatus, the armature could be held stationary while the cutting tool orbits the commutator in planetary fashion. However, all of the general principles discussed herein are equally applicable to all such alternative turning apparatus.

The invention claimed is:

1. An apparatus for finishing the surface of a commutator on a rotatable dynamo-electric machine armature such that the commutator surface is a substantially cylindrical shape and is substantially concentric with the axis of rotation of said armature, said apparatus comprising:

inspection means for determining if said surface is a substantially cylindrical shape and substantially concentric with the axis of rotation by generating data indicative of substantially the minimum amount of material that must be cut from said surface in order for said surface to be substantially cylindrical in shape and substantially concentric with the axis of rotation;

turning means for cutting said surface in response to said generated data, to a substantially cylindrical shape which is concentric with the axis of rotation if said inspection means determines that said surface is not substantially cylindrical in shape or if said surface is not substantially concentric with the axis of rotation; and finishing means for providing roughness to said substantially cylindrical and concentric surface whether or not said surface has been cut by said turning means.

2. The apparatus defined in claim 1 wherein said data comprises at least a minimum radial distance between the axis of rotation of said armature and said commutator surface prior to finishing said surface.

3. The apparatus defined in claim 2 further comprising:

additional inspection means for determining if the surface of the armature lamination stack is substantially cylindrical in shape before said inspection means determines if said commutator surface is substantially cylindrical in shape; and additional turning means responsive to said additional inspection means for turning said armature lamination stack if said additional inspection means determines that said armature lamination stack surface is not substantially cylindrical in shape.

4. The apparatus defined in claim 2 wherein:

said armature is rotated at a first speed within a first predetermined range for said inspection means to operate; and said armature is accelerated from said first speed to a second speed within a second predetermined range for said turning means to operate.

5. A method for finishing the surface of a commutator on a rotatable dynamo-electric machine armature such that the commutator surface is a substantially cylindrical shape and is substantially concentric with the axis of rotation of said armature, said method comprising the steps of:

inspecting said surface to determine if said surface is a substantially cylindrical shape and substantially concentric with the axis of rotation by generating data indicative of substantially the minimum amount of material that must be cut from said surface in order for said surface to be substantially cylindrical in shape and substantially concentric with the axis of rotation;

turning said surface in response to said generated data, to a substantially cylindrical shape which is concentric with the axis of rotation if said inspecting step determines that said surface is not substantially cylindrical in shape or if said surface is not substantially concentric with the axis of rotation; and finishing said surface to provide a roughness to said substantially cylindrical and concentric surface whether or not said surface has been cut by said turning step.

6. The method defined in claim 5 wherein said data comprises at least a minimum radial distance between the axis of rotation of said armature and said commutator surface prior to finishing said surface.

7. The method defined in claim 6 further comprising:

additional inspecting for determining if the surface of the armature lamination stack is substantially cylindrical in shape before said inspecting step determines if said commutator surface is substantially cylindrical in shape; and additional turning responsive to said additional inspecting step for turning said armature lamination stack if said additional inspecting step determines that said armature lamination stack surface is not substantially cylindrical in shape.

8. The method defined in claim 6 wherein:

said armature is rotated at a first speed within a first predetermined range before said inspecting step can occur; and said armature is accelerated from said first speed to a second speed within a second predetermined range before said turning step can occur.

9. In apparatus for finishing the surface of a commutator on a rotatable dynamo-electric machine armature by subjecting the commutator to a turning operation in which the commutator surface is cut to a substantially cylindrical shape which is substantially concentric with the axis of rotation of said armature, the improvement comprising:

means for determining the minimum radial distance between the axis of rotation of said armature and said commutator surface prior to said turning operation; and means for controlling said turning operation based at least in part on said minimum radial distance in order to remove substantially the minimum amount of material that must be cut, if at all, from said surface in order for said surface to be substantially cylindrical in shape and substantially concentric with the axis of rotation.

10. The apparatus defined in claim 9 wherein said means for controlling controls said turning operation to cut said commutator surface so that the radius of said substantially cylindrical shape is approximately equal to said minimum radial distance.

11. The apparatus defined in claim 9 further comprising:

means for determining the maximum radial distance between the axis of rotation of said armature and said commutator surface prior to said turning operation; and means for processing said minimum radial distance and said maximum radial distance to determine if said turning operation is required.

12. In a method for finishing the surface of a commutator on a rotatable dynamo-electric machine armature by subjecting the commutator to a turning operation in which the commutator surface is cut to a substantially cylindrical shape which is substantially concentric with the axis of rotation of said armature, the improvement comprising the steps of:

determining the minimum radial distance between the axis of rotation of said armature and said commutator surface prior to said turning operation; and controlling said turning operation based at least in part on said minimum radial distance in order to determine the minimum amount of material that must be cut, if at all, from said surface in order for said surface to be substantially cylindrical in shape and substantially concentric with the axis of rotation.

13. The method defined in claim 12 wherein said controlling step controls said turning operation to cut said commutator surface so that the radius of said substantially cylindrical shape is approximately equal to said minimum radial distance.

14. The method defined in claim 12 further comprising the steps of:

determining the maximum radial distance between the axis of rotation of said armature and said commutator surface prior to said turning operation; and processing said minimum radial distance and said maximum radial distance to determine if said turning operation is required.

15. Apparatus for successively finishing the surfaces of a plurality of commutators, each of which is disposed on a respective one of a plurality of rotatable dynamo-electric machine armatures, comprising:

means for inspecting each successive armature to determine if the surface of the commutator is a substantially cylindrical shape which is substantially concentric with the axis of rotation;

means for subjecting each successive armature to a turning operation responsive to said means for inspecting in which a minimum amount of material is cut from the surface of the commutator on that armature so that said surface is substantially cylindrical in shape and substantially concentric with the axis of rotation of said armature, unless said surface is already substantially cylindrical in shape and concentric with the axis of rotation;

means for detecting at least one characteristic of the commutators of at least selected ones of the armatures that have just been through said turning operation; and feedback means responsive to said means for detecting for automatically selectively modifying said turning operation for subsequent armatures based on the characteristic detected by said means for detecting.

16. The apparatus defined in claim 15 wherein the characteristic detected by said means for detecting is indicative of the radius of said cylindrical shape, and wherein said feedback means modifies said turning operation to modify the radius of said cylindrical shape for said subsequent armatures.

17. The apparatus defined in claim 15 wherein the characteristic detected by said means for detecting is indicative of the roughness of the surface of said cylindrical shape, and wherein said feedback means modifies said turning operation to modify the roughness of the surface of said cylindrical shape for said subsequent armatures.

18. The apparatus defined in claim 15 wherein said feedback means comprises:

means for comparing said characteristic detected for each armature to at least one predetermined threshold value for said characteristic in order to cause said feedback means to modify said turning operation based on how said detected characteristic compares to said threshold value.

19. The apparatus defined in claim 18 wherein said feedback means further comprises:

trend detection means responsive to said means for comparing for causing said feedback means to modify said turning operation when a multiplicity of successive armatures have been found to have said detected characteristic bearing a predetermined relationship to said threshold value.

20. The apparatus defined in claim 15 further comprising:

means for comparing said characteristic detected for each armature to at least one predetermined threshold value for said characteristic;

trend detection means responsive to said means for comparing for determining when a multiplicity of successive armatures have been found to have said detected characteristic bearing a predetermined relationship to said threshold value; and means for producing an output indication of a trend in said characteristic when said trend detection means determines that a multiplicity of successive armatures have been found to have said detected characteristic bearing said predetermined relationship to said threshold value.

21. The apparatus defined in claim 15 further comprising:

means for comparing said characteristic detected for each armature to at least one predetermined rejection threshold value for said characteristic; and means for rejecting said armature if said means for comparing indicates that said characteristic for said armature bears a predetermined relationship to said rejection threshold value.

22. The apparatus defined in claim 15 further comprising:

means for comparing said characteristic for each armature to at least one predetermined rejection threshold value for said characteristic; and means for stopping said apparatus if said means for comparing indicates that said characteristic for said armature bears a predetermined relationship to said rejection threshold value.

23. A method for successively finishing the surfaces of a plurality of commutators, each of which is disposed on a respective one of a plurality of rotatable dynamo-electric machine armatures, comprising the steps of:

inspecting each successive armature to determine if the surface of the commutator is a substantially cylindrical shape which is substantially concentric with the axis of rotation;

subjecting each successive armature to a turning operation responsive to said inspecting step in which a minimum amount of material is cut from the surface of the commutator on that armature so that said surface is substantially cylindrical in shape and substantially concentric with the axis of rotation of said armature, if said surface if not already substantially cylindrical in shape and concentric with the axis of rotation;

detecting at least one characteristic of the commutators of at least selected ones of the armatures that have just been through said turning operation; and automatically selectively modifying said turning operation for subsequent armatures based on the characteristic detected by said detecting step.

24. The method defined in claim 23 wherein the characteristic detected in said detecting step is indicative of the radius of said cylindrical shape, and wherein said modifying step modifies said turning operation to modify the radius of said cylindrical shape for said subsequent armatures.

25. The method defined in claim 23 wherein the characteristic detected in said detecting step is indicative of the roughness of the surface of said cylindrical shape, and wherein said modifying step modifies said turning operation to modify the roughness of the surface of said cylindrical shape for subsequent armatures.

26. The method defined in claim 23 wherein said modifying step comprises the step of:

comparing said characteristic detected for each armature to at least one predetermined threshold value for said characteristic in order to cause said modifying step to modify said turning operation based on how said detected characteristic compares to said threshold value.

27. The method defined in claim 26 wherein said modifying step further comprises the step of:

identifying a trend in said detected characteristic after said comparing step has found that the detected characteristic for a multiplicity of successive armatures bears a predetermined relationship to said threshold value.

28. The method defined in claim 23 further comprising the steps of:

comparing said characteristic detected for each armature to at least one predetermined threshold value for said characteristic;

identifying a trend in said detected characteristic after said comparing step has found that the detected characteristic for a multiplicity of successive armatures bears a predetermined relationship to said threshold value; and producing an output indication of said trend when said identifying step identifies said trend.

29. The method defined in claim 23 further comprising the steps of:

comparing said characteristic detected for each armature to at least one predetermined rejection threshold value for said characteristic; and rejecting said armature if said comparing step indicates that said characteristic for said armature bears a predetermined relationship to said rejection threshold value.

30. The method defined in claim 23 further comprising the steps of:

comparing said characteristic for each armature to at least one predetermined rejection threshold value for said characteristic; and stopping said method if said comparing step indicates that said characteristic for said armature bears a predetermined relationship to said rejection threshold value.

31. In apparatus for finishing the surface of a lamination stack on a rotatable dynamo-electric machine armature by subjecting the lamination stack to a turning operation in which the lamination stack surface is cut to a substantially cylindrical shape which is substantially concentric with the axis of rotation of said armature, the improvement comprising:

means for determining the minimum radial distance between the axis of rotation of said armature and said lamination stack surface prior to said turning operation; and means for controlling said turning operation based at least in part on said minimum radial distance in order to determine the minimum depth to which said lamination stack surface is cut in said turning operation.

32. The apparatus defined in claim 31 further comprising:

means for determining the maximum radial distance between the axis of rotation of said armature and said lamination stack surface prior to said turning operation; and means for processing said minimum radial distance and said maximum radial distance to determine if said turning operation is required.

33. In a method for finishing the surface of a lamination stack on a rotatable dynamo-electric machine armature by subjecting the lamination stack to a turning operation in which the lamination stack surface is cut to a substantially cylindrical shape which is substantially concentric with the axis of rotation of said armature, the improvement comprising the steps of:

determining the minimum radial distance between the axis of rotation of said armature and said lamination stack surface prior to said turning operation; and controlling said turning operation based at least in part on said minimum radial distance in order to determine the minimum depth to which said lamination stack surface is cut in said turning operation.

34. The method defined in claim 33 further comprising the steps of:

determining the maximum radial distance between the axis of rotation of said armature and said lamination stack surface prior to said turning operation; and processing said minimum radial distance and said maximum radial distance to determine if said turning operation is required.

* * * * *